United States Patent [19]
Collomb-Ceccarini et al.

[11] Patent Number: 4,921,920
[45] Date of Patent: May 1, 1990

[54] PROCESS FOR THE POLYMERIZATION OR COPOLYMERIZATION OF ALPHA-OLEFINS IN A FLUIDIZED BED, IN THE PRESENCE OF A ZIEGLER-NATTA CATALYST SYSTEM

[75] Inventors: Joelle Collomb-Ceccarini, Marseille; Pierre Crouzet, Matrigues, both of France

[73] Assignee: BP Chemicals Limited, London, England

[21] Appl. No.: 117,399

[22] Filed: Nov. 3, 1987

Related U.S. Application Data

[63] Continuation of Ser. No. 833,391, filed as PCT GB85/00283 on Jun. 27, 1985, published as WO86/00314 on Jun. 16, 1986, abandoned.

[30] Foreign Application Priority Data

Jun. 28, 1984 [FR] France ............................... 84 10215

[51] Int. Cl.$^5$ ........................... C08F 2/34; C08F 10/00
[52] U.S. Cl. .................... 526/125; 502/120; 526/901; 526/904; 526/352; 526/138
[58] Field of Search .................................. 526/88, 125

[56] References Cited

U.S. PATENT DOCUMENTS

| 4,130,699 | 12/1978 | Hoff et al. | 526/84 |
| 4,208,497 | 6/1980 | Bronstert et al. | 526/138 |
| 4,282,341 | 8/1981 | Klaerner et al. | 526/138 |
| 4,326,048 | 4/1982 | Stevens et al. | 526/84 |
| 4,482,687 | 11/1984 | Noshay et al. | 526/904 |
| 4,511,703 | 4/1985 | Bailly | 526/125 |
| 4,579,836 | 4/1986 | Arzoumanidis et al. | 526/125 |

FOREIGN PATENT DOCUMENTS

| 99774 | 2/1984 | European Pat. Off. | |
| 2844312 | 4/1979 | Fed. Rep. of Germany | 526/901 |

Primary Examiner—Edward J. Smith
Attorney, Agent, or Firm—Brooks Haidt Haffner & Delahunty

[57] ABSTRACT

The present invention relates to a gas phase process for the (co-)polymerization of alpha-olefins in a fluidized bed, by means of a catalyst system of the Ziegler-Natta type consisting of a catalyst (a) comprising magnesium, halogen and transition metal atoms and a cocatalyst (b) consisting of an organometallic compound. The catalyst system is (i) prepared in a granular form, either fixed on a granular support or converted into a prepolymer, (ii) then subjected to a treatment by a polymerization inhibiting agent in the absence of alpha-olefins, and then (iii) brought into contact with alpha-olefins under (co-)polymerization conditions in the fluidized bed, in the presence of a cocatalyst (c) consisting of an organometallic compound, identical or different from the cocatalyst (b).

9 Claims, No Drawings

PROCESS FOR THE POLYMERIZATION OR COPOLYMERIZATION OF ALPHA-OLEFINS IN A FLUIDIZED BED, IN THE PRESENCE OF A ZIEGLER-NATTA CATALYST SYSTEM

This application is a continuation of application Ser. No. 833,391, filed as PCT GB85/00283 on Jun. 27, 1985, published as WO86/00314 on Jun. 16, 1986, now abandoned.

No. 833,391, filed Feb. 19, 1986, now abandoned.

The present invention relates to a process for the production of polyolefins in the gas phase by polymerisation or copolymerisation of alpha-olefins under low pressure by means of catalyst systems known as Ziegler-Natta systems.

It is known that catalyst systems for polymerisation and copolymerisation of alpha-olefins known as Ziegler-Natta systems consist on the one hand, by way of catalysts, of compounds of transition metals belonging to groups IV, V and VI of the Periodic Table of Elements, and on the other hand, by way of cocatalysts, of organo-metallic compounds of metals of groups I to III of the said Table. The compounds most utilised are on the one hand the halogenated derivatives of titanium and vanadium, or chromium compounds and on the other hand alkylaluminium or alkylzinc compounds.

It is known that alpha-olefins can be polymerised in the gas phase, for example in a fluidised-bed reactor in which the solid polymer being formed is maintained in the fluidised state by means of a rising gas current comprising the alpha-olefins to be polymerised. The gas mixture leaving the reactor is generally cooled before being recycled to the reactor, an additional quantity of alpha-olefins corresponding to the quantity consumed being added. The speed of fluidisation in the fluidised bed reactor should be sufficiently high to ensure homogenisation of the fluidised bed and to eliminate effectively the heat produced by the polymerisation reaction. The polymerisation may be effected by means of a catalyst system of the Ziegler-Natta type, introduced continuously or semi-continuously into the fluidised bed reactor. The withdrawal of the polymer produced may also be effected in a continuous or a semi-continuous manner.

The two ingredients of the catalyst system, i.e. the catalyst and the co-catalyst, may be brought into contact either prior to their introduction into the fluidised bed reactor, or in the actual interior of this reactor. However, experience has shown that, whatever the method employed, the polymerisation reaction always starts up very abruptly and attains a maximum speed as soon as the catalyst system is introduced into the fluidised bed, this rate of polymerisation subsequently decreasing as time goes on, in accordance with a more or less rapid deactivation process. It is therefore in the initial phase of polymerisation that the risk of forming hot spots and bursting of the grains forming the fluidised bed into fine particles are at their greatest. These hot spots may lead to the formation of agglomerates and to setting of the polymer inside the fluidised bed, generally involving the stoppage of polymerisation. Moreover, the fine particles contained in the fluidised bed are inevitably entrained and carried outside the fluidised bed and lead to undesirable reactions outside it.

These undesirable phenomena are especially frequent when catalyst systems are employed which are very active, comprising catalysts based on magnesium and transition metals, it being possible to obtain these catalysts by reacting organo-magnesium compounds and compounds of transition metals, or by pulverising magnesium compounds such as magnesium chloride in the presence of transition metal compounds. It is also known that in view of their particle size and their great activity, these catalyst systems should be introduced into the fluidised bed reactor in granular form, the size of the granules being sufficiently large, usually over 50 microns, to avoid the entrainment of the granules outside the fluidised bed.

The granules can be obtained from a support, this support being generally of inorganic nature; it is usually made of refractory products such as alumina, silica, aluminium silicate or magnesia. The catalyst system is then generally fixed either by impregnation or by precipitation on to this support. This type of catalyst system is known as a supported system.

If the granular support selected is of an organic nature, it is generally composed of a polyolefin which may be of a kind more or less identical to that produced during polymerisation in the gas phase. The catalyst system in granular form can also be obtained as a result of an operation known as pre-polymerisation during which the catalyst system is brought into contact with one or more olefins which are polymerised into a granular prepolymer. In this case the catalyst system is introduced into the fluidised bed reactor in the form of such a pre-polymer.

Generally, the preparation of these catalyst systems in granular form confers on the said catalyst systems specific properties which are of interest for the technique of gas-phase polymerisation, and in particular fluidised-bed polymerisation, these properties relating especially to the particle size and abrasion-resistance. Now it is known that the use of a catalyst system in a granular form increases the activity of the said catalyst system, especially when the polymerisation reaction starts up. This increase in activity, however, may be limited by using catalyst systems in a granular form containing only small quantities of the catalyst itself. However, the polymers finally obtained have either relatively high content of inorganic residues which harms the properties of the said polymers, or contain an excessive quantity of prepolymer which decreases the economic value of gas-phase polymerisation processes.

It is also known to use polymerisation inhibiting agents, such as carbon monoxide or carbon dioxide, in the preparation of catalysts intended for Ziegler-Natta type catalyst systems which are characterised by a relatively low polymerisation activity. This preparation consists in particular in bringing into contact catalysts consisting basically of titanium trichloride and titanium tetra-chloride with an atmosphere of carbon monoxide or carbon dioxide, under a pressure generally comprised between 0.01 and 1 MPa. The catalyst systems obtained from these catalysts and co-catalyst of the organo-aluminium compound type are totally inactive for the polymerisation of olefins during a period known as the "induction" period which is at least equal to 1 minute and generally over 5 minutes. It is thus possible to avoid the phenomena of encrustation or clogging of the introduction devices for the catalyst systems into the polymerisation medium. However, in fluidised bed polymerisation processes where, for reasons of particle size, the catalyst systems employed have to be previously fixed on a support or put into the fore of prepolymers, which operations lead to an activation of the said catalyst systems, the result is that the initial inhibition treatment of the catalyst loses its effect.

It has now been found that it is possible to resolve these difficulties and to obtain easily by polymerisation or copolymerisation in a fluidised bed, without the risk of formation of agglomerates or fine particles, polymers or copolymers of alpha-olefins of a very diverse quality and with a relatively low content of catalyst residues. More especially, the interest of the present invention is directed to catalyst systems making it possible to satisfy at one and the same time two apparently opposite requirements, one relating to the particle size, since the said catalyst systems are in granular form which increases the polymerisation activity, and the other relating to the control of the polymerisation activity, since the latter must be comparatively reduced in the initial phase of polymerisation and yet be maintained subsequently at a sufficiently high level.

The object of the present invention is therefore a process for the polymerisation or copolymerisation of alpha-olefins comprising 2 to 8 carbon atoms in a fluidised bed, by means of a catalyst system of the Ziegler-Natta type consisting on the one hand of a catalyst (a) comprising atoms of magnesium, halogen and a transition metal belonging to Groups IV, V and VI of the Periodic Table of Elements and, on the other hand, of a cocatalyst (b) consisting of an organo-metallic compound of a metal of Groups I to III of this Table which process is characterised in that the catalyst system is first of all either fixed on an inorganic granular support, or converted into a prepolymer, then subjected to a treatment by a polymerisation inhibitor, before being brought into contact with the olefins under polymerisation or copolymerisation conditions in a fluidised bed in the presence of an additional quantity of a cocatalyst (c) consisting of an organo-metallic compound of a metal in Groups I to III of the Periodic Table of Elements which is identical or different from that of which cocatalyst (b) consists.

Catalysts (a) employed according to the invention may correspond in particular to the formula:

$$Mg_m Me_n M(OR_1)_p (R_2)_q X_r D_s$$

in which

Me is an atom of aluminium and/or zinc, M is an atom of a transition metal belonging to Groups IV, V and VI of the Periodic Table of Elements, preferably an atom of titanium and/or vanadium, $R_1$ is an alkyl group comprising of 2 to 14 carbon atoms, $R_2$ is an alkyl group comprising 2 to 12 carbon atoms, X is an atom of chlorine and/or bromine, D is an electron donor compound comprising at least 1 oxygen, sulphur, nitrogen or phosphorus atom, where m is comprised between 0.5 and 50, preferably comprised between 1 and 10, n is comprised between 0 and 1, preferably comprised between 0 and 0.5, p is comprised between 0 and 3, and is preferably 1 or 2, q is comprised between 0 and 1, preferably comprised between 0 and 0.5, r is comprised between 2 and 104, preferably comprised between 3 and 24, and s is comprised between 0 and 60, preferably comprised between 0 and 20.

For polymerising ethylene or copolymerising ethylene with alpha-olefins, the catalyst (a) can be obtained by various processes, in particular by those according to which a magnesium compound, such as magnesium chloride, is ground in the presence of at least one transition metal compound, or else a magnesium compound is precipitated at the same time as one or more transition metal compounds.

Catalysts (a) may, for example, be obtained by reacting an organo-magnesium compound and a compound of titanium at its maximum valency, possibly in the presence of an electron donor compound D chosen, for example, from among amines, amides, phosphines, sulphoxides and aliphatic ether oxides.

Preferably catalyst (a) is obtained by reacting at between $-20°$ C. and $150°$ C., and more particularly between $50°$ and $100°$ C., one or more compounds of tetravalent titanium of the formula $$TiX_{4-t}(OR_1)_t$$

in which X is an atom of chlorine or bromine, $R_1$ is an alkyl group containing 2 to 14 carbon atoms and t is an integer or fraction which is comprised between 0 and 3 and which is preferably 1 or 2, and an organo-magnesium compound of the formula $(R_2)MgX$ or of the formula $Mg(R_2)_2$ in which X is a chlorine or bromine atom and $R_2$ is an alkyl group comprising 2 to 12 carbon atoms. The reaction between the tatravalent titanium compound or compounds and the organo-magnesium compound is advantageously performed in the presence of an alkyl halide of the formula $(R_2)X$ in which $R_2$ and X have the same definitions as above, and possibly in the presence of an electron donor compound D, these various compounds being employed in molar ratios such as:

$TiX_{4-t}(OR_1)_t/(R_2)MgX$ is comprised between 0.05 and 0.5 and preferably between 0.1 and 0.33, $(R_2)X/(R_2)MgX$ is comprised between 1 and 2, and $D/TiX_{4-t}(OR_1)_t$ is comprised between 0 and 0.5 and preferably between 0 and 0.2, or such that:

$TiX_{4-t}(OR_1)_t/Mg(R_2)_2$ is comprised between 0.05 and 0.5 and preferably between 0.1 and 0.33, $(R_2)X/Mg(R_2)_2$ is comprised between 2 and 4, and $D/TiX_{4-t(OR_1)_t}$ is comprised between 0 and 0.5 and preferably between 0 and 0.2.

Another technique for the preparation of catalysts (a), according to the invention consists in reacting at between $-20°$ C. and $150°$ C., and preferably between $50°$ C. and $100°$ C., magnesium metal with an alkyl halide and one or more compounds tetravalent titanium, these latter compounds having the formulae $(R_2)X$ and $TiX_{4-t}(OR_1)_t$ respectively as defined above, possibly in the presence of the electron donor compound D. In this case the reagents may be employed in molar ratios:

$TiX_{4-t}(ORhd 1)_t/Mg$ is comprised between 0.05 and 0.5 and preferably between 0.1 and 0.33, $(R_2)X/Mg$ is comprised between 0.5 and 8 and preferably between 1.5 and 5, and $D/TiX_{4-t}(OR_1)_t$ is comprised between 0 and 0.5 and preferably between 0 and 0.2.

One may also prepare the catalyst (a) by precipitating a transition metal compound on solid particles consisting mainly of magnesium chloride. One may, for example, employ solid particles of magnesium chloride obtained by reacting an organo-magnesium compound and a chlorinated organic compound complying, in particular with the following conditions:

the organo-magnesium compound is either a dialkylmagnesium of the formula $R_3 Mg R_4$, or an organomagnesium derivative of the formula $R_3Mg R_4, xAl(R_5)_3$, in which formulae $R_3$, $R_4$ and $R_5$ are identical or different alkyl groups having 2 to 12 carbon atoms and x is a number comprised between 0.01 and 1;

the chlorinated organic compound is an alkyl chloride of the formula $R_6$ Cl, in which $R_6$ is a secondary alkyl or preferably a tertiary alkyl group with 3 to 12 carbon atoms;

the reaction is performed in the presence of an electron donor D, which may be chosen from amongst a large variety of products such as amines, amides, phosphines, sulphoxides, sulphones or aliphatic ether oxides.

Moreover, the various reagents involved in the preparation of such solid particles of magnesium chloride may be employed under the following conditions:

the molar ratio $R_6Cl:R_3MgR_4$ is comprised between 1.5 and 2.5 and preferably comprised between 1.85 and 2.2;

the molar ratio $R_6Cl:R_3MgR_4, \times Al(R_5)_3$ is comprised between $1.5(1+3\times/2)$ and $2.5(1+3\times/2)$, and preferably comprised between $1.85(1+3\times/2)$ and $2.2(1+3\times/2)$;

the molar ratio between the electron donor compound D and the organomagnesium compound ($R_3MgR_4$ or $R_3MgR_4, xAl(R_5)_3$ is comprised between 0.01 and 1;

the reaction between the organomagnesium compound and the chlorinated organic compound takes place with stirring, in a liquid hydrocarbon, at a temperature comprised of between 5° C. and 80° C.

The precipitation of a transition metal compound onto the solid particles of magnesium chloride may be performed by a reduction reaction of a transition metal compound, such as titanium or vanadium at maximum valency, by means of organo-metallic compounds of metals of groups II and III of Periodic Table of Elements.

Preferably a compound of titanium is used which has the formula $TiX_{4-t}(OR_1)_t$ in which $R_1$, X and t correspond to the same definitions as above, the reduction being made by means of a reducing agent selected from among the organo-magnesium compounds of the formula $R_3Mg R_4$, in which $R_3$ and $R_4$ correspond to the same definitions as above, the organo-zinc compounds of the formula $Zn (R_7)_{2-y}X_y$, in which $R_7$ is an alkyl group having 2 to 12 carbon atoms, X is a chlorine or bromine atom and y is an integer or fraction such that $0 \leq y \leq 1$ and the organo-aluminium compound of the formula $Al(R_8)_{3-z}X_z$, in which $R_8$ is an alkyl group having 2 to 12 carbon atoms, X is a chlorine or bromine atom and z is an integer or fraction such that $0 \leq z \leq 2$.

The said reduction reaction may be carried out in the presence of an electron donor compound D such as defined above.

The relative quantities of the various compounds employed (magnesium chloride, titanium compound, organomagnesium or organozinc or organoaluminium, electron donor), may be in molar ratios such that:

magnesium chloride/titanium compound comprised between 1 and 8, and preferably comprised between 2 and 5;

organomagnesium or organozinc or organoaluminium compounds/titanium compound less than 2 and preferably comprised between 0.5 and 1.5;

electron donor compound/titanium compound comprised between 0 and 1, and preferably comprised between 0 and 0.5.

Precipitation may be performed at a temperature comprised between −30° C. and 100° C., with stirring, in a liquid hydrocarbon medium.

For polymerisation of propylene or copolymerisation of propylene with ethylene or other alpha-olefins, catalysts (a) must not only have a satisfactory polymerising activity but also a high stereospecificity. In this case one of the methods recommended for the preparation of catalyst (a) consists in integrating with titanium tetrachloride solid particles of magnesium chloride, such as those obtained for example according to the method described above, this impregnation being performed preferably in the presence of an electron donor compound D.

The preparation of such a catalyst may advantageously be performed according to a process comprising the following two stages:

(a) treatment of solid particles of magnesium chloride by means of an electron donor compound D chosen in particular from among aromatic acid ester or aromatic ethers, (b) impregnation of the solid magnesium chloride particles thus treated by means of titanium tetrachloride.

The quantity of electron donor compound D used during the first stage is generally comprised between 0.06 and 0.2 mole of electron donor compound per mole of magnesium compound and the temperature of the treatment may be comprised between about 20° C. and 50° C.

In the second stage the solid magnesium chloride particles are impregnated with titanium tetrachloride used the pure state or in a liquid hydrocarbon medium. One method consists in particular in grinding the solid magnesium chloride particles in the presence of titanium tetrachloride. The quantity of titanium tetrachloride must be sufficient to be able to fix on these particles from 0.5 to 3 gram atoms of titanium per 100 gram atoms of magnesium, and the impregnation temperature may be comprised between about 80° C. and 150° C.

The catalyst (a) as prepared according to one of these methods generally occurs in the form of solid particles having a particle size and a polymerisation activity which are in general unsuitable for use in gas fluidised bed polymerisation. In particular, the particles of catalyst (a) have a relatively small mean diameter by mass, generally less than 50 microns, which makes it difficult to use them direct in a fluidised bed polymerisation reactor.

For this reason, the catalyst system consisting of the catalyst (a) and the cocatalyst (b) should first of all either be converted into a prepolymer or fixed on a granular support.

Conversion of the catalyst system into prepolymer is generally performed by bringing one or more alpha-olefins into contact with the said catalyst system. This operation, known as prepolymerisation, may be carried out either in suspension in a liquid medium such as aliphatic hydrocarbons or liquid alpha-olefins, or in the gas phase. The prepolymerisation may be carried out in two stages. In this case the first prepolymerisation stage or stage of coating the catalyst (a) is first carried out by polymerisation or copolymerisation of alpha-olefins in suspension in a liquid medium, such as an aliphatic hydrocarbon. This stage may generally be continued until the coated catalyst obtained contains from 0.1 to 10 g of polymer or copolymer per milligram atom of transition metal. The second stage of prepolymerisation may proceed either in suspension in a liquid medium or in the gas phase; generally this stage may be continued whilst preserving a suitable activity in the catalyst until the prepolymer contains $2 \times 10^{-3}$ to $10^{-1}$, and preferably from $4 \times 10^{-3}$ to $3 \times 10^{-2}$ milligram atoms of transition metal per gram.

The catalyst system may also be fixed on a granular support consisting for example of refractory products, chosen from amongst alumina, silica, aluminium silicate and magnesia. This operation may be carried out, for example, in the following manner. The catalyst (a) may be put into the form of a complex by dissolving in an organic solvent consisting of an electron donor compound D preferably chosen from amongst the esters of carboxylic acid, aliphatic ether oxides, cyclic ether oxides and ketones. This complex in solution may then isolated by precipitation, for example either by cooling the solution or by adding to it a liquid hydrocarbon, then drying the solid complex thus obtained. The composition of the complex is such that:

the atomic ratio of the quantity of magnesium to the quantity of transition metal is comprised between 0.5 and 50, preferably comprised between 1 and 10, and the ratio of the number of gram molecules of the electron donor compound D to the number of gram atoms of transition metal is comprised between 2 and 60, and preferably comprised between 3 and 20.

The catalyst (a), thus put into the form of a complex, may be fixed on the inorganic granular support by being placed in suspension in a liquid hydrocarbon, such n-hexane, in the presence of the said inorganic granular support and in the presence of the cocatalyst (b). The catalyst system fixed on the inorganic granular support is then obtained by evaporating the liquid hydrocarbon and drying the solid obtained.

One may also carry out a dry mixing of the catalyst (a) in the form of the solid complex prepared previously and of the granular support, the latter preferably being free from all traces of water by heat treatment and an addition of the cocatalyst (b).

Another technique consists in mixing the catalyst (a) in the form of a complex in solution in the organic solvent, prepared previously, with the granular support, the latter also being preferably freed from all traces of water by heat treatment, and having cocatalyst (b) added to it. From this mixture there is isolated a solid by evaporating the organic solvent. This solid is then placed in suspension in a liquid hydrocarbon such as isopentane, and cocatalyst (b) is added to it. From this suspension the catalyst system is obtained fixed on the inorganic granular support, by evaporating the liquid hydrocarbon.

The catalyst system fixed on the granular support may contain from $3 \times 10^{-2}$ to $5 \times 10^{-1}$, and preferably from $9 \times 10^{-2}$ to $3 \times 10^{-1}$ gram milliatoms of transition metal of the catalyst (a) per gram.

The preparation of a catalyst system converted into prepolymer or fixed on a granular support is carried out according to the invention in such a way that the solid particles obtained have a mean diameter by mass comprised between 50 and 300 microns and preferably comprised between 70 and 250 microns, which are dimensions compatible with use for polymerisation in a fluidised bed.

Moreover, the catalyst system converted into prepolymer, or fixed on a granular support, contains the quantity of the catalyst (a) and quantities of cocatalyst (b) such that the atomic ratio of the quantity of metal of the cocatalyst (c) to the quantity of transition metal of the catalyst (a) is comprised between 0.5 and 50, and preferably comprised between 0.7 and 10.

As the cocatalyst (b), one may use the organoaluminium and organo-zinc compounds, and in particular trialkylaluminium, the dialkylzinc, halides and alcoholates of alkylaluminium.

According to the invention the catalyst system converted into prepolymer or fixed on a granular support is then subjected to treatment by a polymerisation inhibiting agent. By polymerisation inhibiting agent is meant any compound, whether gaseous or liquid under the conditions of use, capable of slowing down or totally stopping the polymerisation reaction of the alpha-olefins in the presence of a catalyst system of the Ziegler-Natta type, and more generally known as a "poison" of this reaction.

As polymerisation inhibiting agent, one may use especially the oxides and sulphides of carbon, carbonyl oxysulphide, the oxides and peroxides of nitrogen, oxygen; however, carbon monoxide or carbon dioxide are preferred. The polymerisation inhibiting agent may be used in pure state, diluted in an inert gas such as nitrogen, or dissolved in an inert solvent such as a liquid hydrocarbon.

The quantity of polymerisation inhibiting agent used according to the invention is such that the ratio of the number of gram molecules of the polymerisation inhibiting agent to the number of gram atoms of transition metal contained in the catalyst system is comprised between 0.001 and 0.1, preferably comprised between 0.002 and 0.05, and more especially comprised between 0.005 and 0.03. The use of too small a quantity of polymerisation inhibiting agent would have no or little effect on the catalyst system, which at the moment of its introduction into the fluidised bed polymerisation reactor would have too high an initial speed of polymerisation and would produce hot spots in the fluidised bed, thus causing the formation of polymer agglomerates. On the other hand, the use of too large a quantity of polymerisation inhibiting agent would produce a poisoning of the fluidised bed polymerisation or copolymerisation reaction such that the yield of this reaction in relation to the catalyst system would be considerably reduced and would lead to polymers or copolymers having high catalytic residues, containing for example more than $4 \times 10^{-4}$ milligram atoms of transition metal per gram.

When the polymerisation inhibiting agent, in particular, is a gas under the conditions of use, the partial pressure of this gas may be extremely low during the treatment according to the invention and in practice less than $5 \times 10^{-4}$ MPa. Moreover, it has been found that the concentration of polymerisation inhibiting agent in the reaction medium in which the treatment is performed is in practice less than 0.25 millimoles per liter, and preferably less than 0.1 millimole per liter.

The treatment according to the invention may be carried out by mixing the catalyst system and the polymerisation inhibiting agent either dry, or in suspension in a liquid hydrocarbon such as n-hexane, at a temperature comprised between 0° and 150° C., preferably comprised between 20 and 120° C. and more especially comprised 50° C. and 110° C., for a period which may last for several minutes to several hours, especially a period comprised between 3 and 300 minutes.

The treatment of the catalyst system by the polymerisation inhibiting agent must furthermore be carried out in the absence of alpha-olefins, particularly when the catalyst system employed has been converted into a prepolymer. In this case it is important that this prepolymer should be free from alpha-olefins at the moment of treatment. The presence of alpha-olefin during the treatment would no longer make it possible to reduce and control the initial activity of the catalyst system when the latter is introduced into the fluidised bed reactor.

The catalyst system treated by the polymerisation inhibiting agent is finally brought into contact with the alpha-olefins under the polymerisation or copolymerisation conditions in the gas phase in a fluidised bed reactor, in the presence of an additional quantity of cocatalyst (c), consisting of an organometallic compound of a metal of groups I to III of the Periodic Table of Elements. It would appear to be essential that the catalyst system treated by the polymerisation inhibiting agent should have cocatalyst (c) added to it at the moment of polymerisation or copolymerisation in a fluidised bed. In fact the combination on the one hand of the effects due to the treatment of the polymerisation inhibiting agent and on the other hand of the effects due to the addition of the cocatalyst (c) makes it possible in a surprising manner not only to control the initial speed of polymerisation from the moment of introduction of the catalyst system into the fluidised bed reactor, but also to control the increase in polymerisation speed during the first moments following such introduction, and also subsequently to control the process of deactivation of the catalyst system, in such a way that the overall yield of the reaction in relation to the catalyst is appreciably increased.

As cocatalyst (c), one may use organo-aluminium and organo-zinc compounds, especially trialkylaluminium, dialkylzinc, halides and alcoholates of alkylaluminium. The cocatalyst (c) may be identical to or different from the cocatalyst (b).

The cocatalyst (c) can be added to the granular catalyst system after treatment of the latter by the polymerisation inhibiting agent, but prior to or during contact with the alpha-olefins under the polymerisation or copolymerisation conditions in a fluidised bed. In particular, it may be added to the catalyst system previously placed in suspension in a liquid hydrocarbon, such as n-hexane, and in this case be introduced in the pure state into the said suspension. The catalyst system is finally obtained in the form of a powder after evaporating the liquid hydrocarbon.

It is also possible to introduce the cocatalyst (c) direct into the fluidised bed reactor, regardless of the catalyst system treated by the polymerisation inhibiting agent. In this case, it is particularly advantageous for the cocatalyst (c) to be placed in solution beforehand in a saturated aliphatic hydrocarbon comprising, for example, from 4 to 6 carbon atoms, in order to facilitate dispersion in the fluidised bed, and its contact with the catalyst system introduced as well.

Whatever the method used to employ the additional quantity of cocatalyst (c), this quantity is such that the atomic ratio of the quantity of metal in the said cocatalyst (c) to the quantity of transition metal contained in the catalyst system is comprised between 0.5 and 100, and preferably comprised 0.7 and 60 and more especially comprised between 1 and 30. A ratio of less than 0.5 would lead to a catalyst system with a low polymerisation yield and a ratio of over 100 would lead to a catalyst system which would very rapidly form agglomerates in the fluidised bed polymerisation reactor, and in this way would have lost of the advantages deriving from the process of the present invention.

The catalyst system obtained is brought into contact with one or more alpha-olefins comprising 2 to 8 carbon atoms under polymerisation or copolymerisation conditions in a fluidised bed. This operation is performed continuously by techniques in themselves known, according to which the gaseous mixture containing the alpha-olefins to be polymerised circulate following a rise in gas current through the fluidised bed, consisting of particles of polymer or copolymer being formed. The alpha-olefins to be polymerised are introduced into the fluidised bed reactor at a temperature such that the reaction mixture is at a temperature of at least 60° C. and advantageously of at least 80° C.

The fluidisation speed in the fluidised bed reactor may be sufficiently high to guarantee homogenisation of the fluidised bed and to eliminate effectively the heat produced by polymerisation, without having recourse to any other means of homogenisation, especially mechanical. The fluidisation speed is equal to 2 to 10 times, and preferably equal to 5 to 10 times the minimum speed of fluidisation, that is to say generally comprised between 15 and 80 cm/sec. and preferably comprised between 40 and 80 cm/sec. When traversing the fluidised bed, only a part of the alpha-olefins polymerises in contact with the particles of polymer or copolymer in course of formation.

The part of the alpha-olefins which has not reacted leaves the fluidised bed and passes through a cooling system intended to eliminate the heat produced during the reaction, before being recycled into the fluidised bed reactor by means of a compressor.

The mean pressure in the reactor may be close to atmospheric pressure, but is preferably higher, in order to increase the rate of polymerisation. For example, it may attain 4 MPa.

According to the invention the polymerisation or copolymerisation is advantageously stopped when the polymer or copolymer contains per gram less than $4 \times 10^{-4}$ milligram atoms of transition metal, and preferably less than $2 \times 10^{-4}$ milligram atoms of transition metal.

In order to obtain control of the molecular weight of the polymers or copolymers, it is possible to mix the alpha-olefins to be polymerised or copolymerised with a chain transfer agent, such as hydrogen, in a molar ratio of hydrogen/alpha-olefins comprised for example between 10 and 80%.

According to the process of the invention, it is possible to produce under satisfactory and very simplified industrial conditions, a large number of polymers and copolymers of alpha-olefins of a very reproducible quality, and for example high-density polyethylene, (density over 0.940), amongst which are the homopolymers of ethylene and the copolymers of ethylene and alpha-olefins having from 3 to 8 carbon atoms, linear low-density polyethylene (density less than 0.940), consisting of a copolymer of ethylene and one or more alpha-olefins having from 3 to 8 carbon atoms, with a content by weight of units derived from ethylene of over 80%, elastomeric terpolymers of ethylene, propylene and diene, elastomeric copolymers of ethylene and propylene, having a content by weight of units derived from ethylene comprised between about 30 and 70%, Isocactic polypropylenes and copolymers of propylene and ethylene or other alpha-olefins, having a content by weight of units derived from propylene of greater than 90%, the copolymers of propylene and 1-butene having a content by weight of units derived from 1-butene comprised between 10 and 40%.

The non restrictive examples below illustrate the present invention.

EXAMPLE 1

Preparation of the solid magnesium chloride particles

Into a 5-liter stainless steel reactor provided with a stirrer system rotating at 750 revolutions per minute and containing 800 ml of n-hexane, there are introduced at ambient temperature (20° C.) and under a blanket of nitrogen:

1,725 ml of a solution of butyloctylmagnesium in n-hexane containing 1500 milligram atoms of magnesium and 9.1 ml (or 44.7 millimoles) of di-isoamyl ether.

The reactor is then heated to 50° C., and over 3 hours a mixture of 313 ml of tert.-butyl chloride (or 2 850 millimoles) and 91 ml (or 447 millimoles) of di-isoamyl ether are added drop by drop. At the end of this addition, the suspension is maintained at 50° C. for 3 hours, and the precipitate obtained is then washed 5 times with n-hexane. The solid product obtained (A) consists of solid particles based on magnesium chloride, its chemical composition being such that it contains 1.96 gram atoms of chlorine, 0.04 gram equivalent of Mg-C and 0.02 mole of di-isoamyl ether per gram atom of magnesium. The mean diameter by mass of these particles is equal to 23 microns.

Preparation of the catalyst

Into the same reactor as that used previously, there are introduced at ambient temperature (20° C.) and under a blanket of nitrogen, 3,000 ml of suspension in n-hexane a product (A), containing 1450 millimoles of magnesium chloride, 79 ml (or 390 millimoles) of di-isoamyl ether and 325 ml of a 1.2 molar solution of diethylaluminium chloride in n-hexane (or 390 millimoles).

The reactor is heated to 50° C., and there are gradually introduced into it over 2 hours 650 ml of a 0.6 molar solution of di-n-propoxytitanium dichloride in n-hexane (or 390 millimoles). At the end of this introduction, the temperature is brought to 80° C. and is maintained for 2 hours. The solid product obtained is then washed 5 times with n-hexane to give the catalyst (B), which according to chemical analysis contains per gram atom of titanium:

0.94 gram atom of trivalent titanium
0.06 gram atom of tetravalent titanium
3.85 gram atoms of magnesium
9.97 gram atoms of chlorine
0.20 gram atoms of aluminium and
0.11 mole of di-isoamyl ether.

The catalyst (B) corresponds to the following general formula:

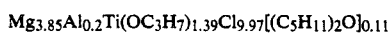
$Mg_{3.85}Al_{0.2}Ti(OC_3H_7)_{1.39}Cl_{9.97}[(C_5H_{11})_2O]_{0.11}$

Catalyst (B) thus defined is a brown-coloured powder consisting of particles having mean diameter by mass equal to 25 microns.

Prepolymerisation and carbon monoxide treatment

Into a 5-liter stainless steel reactor equipped with a stirrer system rotating at 750 revolutions per minute, containing 2 liters of n-hexane heated to 70° C, there are introduced under a blanket of nitrogen 8 ml of a 0.6 molar solution of tri-n-octylaluminium (TnOA) in n-hexane, a quantity of catalyst (B) prepared previously, corresponding to 6 milligram atoms of titanium and a volume of 1.5 liters of hydrogen measured under normal conditions i.e. at 20° C. and 1 standard atmosphere. There are then introduced ethylene at a constant throughput of 160 g/hr for 90 minutes, then a fresh volume of 1.5 liters of hydrogen measured under normal conditions and finally, for a further 90 minutes, ethylene at a constant throughput of 160 g/hr. One then obtains a suspension of prepolymer (C) in n-hexane which is kept under an atmosphere of nitrogen. This prepolymer (C) contains $1.25 \times 10^{-2}$ milligram atoms of titanium per gram and consists of particles having a mean diameter by mass equal to about 120 microns.

The suspension of prepolymer (C) is totally degassed, in order to eliminate the residual ethylene still present in this suspension. The reactor is heated to 80° C. and there are introduced into it, with stirring, a volume of 1.5 ml of carbon monoxide gas measured under normal conditions. This suspension is maintained with stirring at this temperature for 1 hour. At the end of this time it is cooled to ambient temperature (20° C.) and there are added to it under a blanket of nitrogen 20 ml of the 0.6 molar solution of TnOA in n-hexane. This suspension is then transferred into a rotary drier where the prepolymer is dried at 70° C. under an atmosphere of nitrogen. In this way approximately 480 g are obtained of a prepolymer powder (D) ready for use.

Polymerisation in a fluidised bed

Into a fluidised bed reactor with a diameter of 15 cm, operating with a rising gas propelled at a rate of 15 cm/sec, under partial pressures of 1.0 MPa of ethylene and 1.0 MPa of hydrogen, there are introduced 800 g of an inert and perfectly anhydrous polyethylene powder, heated to and maintained at 80° C. There are then introduced 16 g of the prepolymer (D) prepared previously, comprising 0.2 milligram atoms of titanium, by the intermediary of a lock chamber into which the hydrogen is added at ambient temperature (20° C.) until a pressure of 2.5 MPa is obtained inside the said lock chamber. The introduction of the prepolymer into the fluidised bed reactor is performed by opening the communication between the lock chamber and the reactor, the difference in pressures prevailing in these two appliances causing the introduction of the prepolymer into the reactor. After introducing the prepolymer (D) into the fluidised bed reactor, a gradual rise in temperature of the fluidised bed is noted, this increase in temperature attaining a maximum value delta T of approximately 11° C. at the end of a period $t_{delta\ T}$ equal to about 4 minutes.

During this period the rate of polymerisation which, at the moment of introduction of the prepolymer into the fluidised bed reactor, corresponds to an initial activity ($a_o$) equal to 5 850 g of ethylene consumed per milligram atom of titanium, per hour and per MPa of partial pressure of ethylene [g $C_2H_4$/(m.at-g Ti)×(hr)×(MPa $C_2H_4$)], increases gradually up to a value which is equivalent to a maximum activity ($a_m$) equal to 9 600 g$C_2H_4$/(mg.at.Ti)×(hr)×(MPa$C_2H_4$), which value is attained at the end of a time (t $a_m$) equal to approximately 5 minutes after the introduction of the prepolymer into the reactor. After this initial phase of the reaction, the rate of polymerisation decreases subsequently comparatively slowly as time goes on, so that at the end of 2 hours of reaction, approximately 1 800 g of polyethylene have been produced, containing $1.1 \times 10^{-4}$ milligram atoms of titanium per gram.

The main characteristics of the polymerisation are also summarised in Table 1.

EXAMPLE 2

(Comparative)

Prepolymerisation

This is identical to that of Example 1, except for the fact that after prepolymerisation, no carbon monoxide is introduced into the prepolymer suspension. In this way, after drying approximately 480 g of a prepolymer powder (E) ready for use are obtained.

Fluidised bed polymerisation

This is identical to Example 1, except for the fact that instead of using prepolymer (D) prepolymer (E) is used.

After the introduction of prepolymer (E) into the fluidised bed reactor a very rapid increase in temperature of the fluidised bed is noted, this increase of temperature attaining a maximum value delta T of approximately 30° C. at the end of a very short period of time $t_{delta\ T}$ equal to about 0.5 minutes.

The polymerisation reaction in fact has its maximum speed from the moment of introduction of the prepolymer into the fluidised bed reactor.

The initial activity ($a_o$) which is then at the same time the maximum activity ($a_m$) is equal to 14 100 g of $C_2H_4/(mg.at.Ti) \times (hr) \times (MPa C_2H_4)$. In this initial phase of the reaction, the release of heat is so rapid and intense that the prepolymer particles heat up to their melting temperature and form agglomerates of polymer necessitating the stoppage of polymerisation. The main polymerisation characteristics are also summarised in Table I.

EXAMPLE 3

(Comparative)

Prepolymerisation and carbon monoxide treatment

Into a 5-liter stainless steel reactor equipped with a stirrer system rotating at 750 revolutions per minute, containing 2 liters of n-hexane heated to 70° C., there are introduced under a blanket of nitrogen 2S ml of a 0.6 molar solution of tri-n-octylaluminium (TnOA) in n-hexane, a quantity of the catalyst (B) prepared as in Example 1, corresponding to 6 milligram atoms of titanium and a volume of 1.5 liters of hydrogen measured under normal conditions.

The ethylene is then introduced at a constant throughput of 160 g/hr for 90 minutes, then a fresh volume of 1.5 liters of hydrogen measured under normal conditions and finally, for a further 90 minutes, ethylene at a constant throughput of 160 g/hr. A prepolymer suspension (F) in n-hexane is then obtained which is kept under an atmosphere of nitrogen. This prepolymer (F) contains $1.25 \times 10^{-2}$ milligram atoms of titanium per gram and consists of particles having a mean diameter by mass equal to approximately 120 microns.

The suspension of prepolymer (F) is totally degassed in order to eliminate the residual ethylene still present in this suspension. The reactor is heated to 80° C. and there are introduced into it with stirring a volume of 1.5 ml of carbon monoxide gas measured under normal conditions. This suspension is maintained with stirring at this temperature for 1 hour. At the end of this period it is cooled to ambient temperature (20° C.) and transferred into a rotary drier where the prepolymer is dried at 70° C. under an atmosphere of nitrogen. In this way about 480 g are obtained of a prepolymer powder (G) ready for use.

Fluidised bed polymerisation

This is identical to that of Example 1, except for the fact that instead of using prepolymer (D), prepolymer (G) is used.

After the introduction of prepolymer (G) into the fluidised bed reactor, a rapid increase in temperature of the fluidised bed is noted, this increase in temperature attaining a maximum value delta T of approximately 9° C., at the end of a very short period $t_{delta\ T}$, equal to approximately 0.5 minutes.

The polymerisation reaction in fact has its maximum speed from the moment of introduction of the prepolymer into the fluidised bed reactor. The initial activity ($a_o$) which is thus also at the same time the maximum activity ($a_m$) is equal to 5 000 g of $C_2H_4/(Mg.at.Ti) \times (hr) \times (MPa C_2H_4)$.

After this initial phase of the reaction, the rate of polymerisation decreases relatively rapidly as time goes on, so that at the end of 2 hours of reaction, about 400 g of polyethylene been produced, containing $5.0 \times 10^{-4}$ milligram atoms of titanium per gram.

The main polymerisation characteristics are also set out in Table I.

EXAMPLE 4

(Comparative)

Prepolymerisation

This is identical to that of Example 3 (comparative), except for the fact that after the prepolymerisation no carbon monoxide is introduced into the suspension of the prepolymer (C). In this way, after drying, approximately 480 g are obtained of a prepolymer powder (H) ready for use.

Fluidised bed polymerisation

This is identical to that of Example 1, except for the fact that instead of using prepolymer (D), prepolymer (H) is used.

After the introduction of prepolymer (H) into the fluidised bed reactor, a very rapid and intense rise in temperature of the fluidised bed is noted, this increase in temperature attaining a maximum value delta T of about 24° C., at the end of a very short time $t_{delta\ T}$, equal to about 0.5 minutes.

The polymerisation reaction has a maximum speed from the moment of introduction of the prepolymer into the fluidised bed reactor.

The initial activity ($a_o$) which is thus at the same time maximum activity ($a_m$) is equal to 11 700 g of $C_2H_4/(mg.at.Ti) \times (hr) \times (MPa C_2H_4)$. In this initial phase of the reaction the release of heat is so rapid and intense that the particles of prepolymer heat up to their melting temperature and thus form agglomerates of polymer necessitating the stoppage of polymerisation.

The main polymerisation characteristics are also set out in Table I.

EXAMPLE 5

Prepolymerisation and carbon monoxide treatment

This is identical to that of Example 1, except for the fact that instead of introducing a volume of 1.5 ml of carbon monoxide into the suspension of prepolymer (C), there is introduced a volume of 0.7 ml of carbon monoxide measured under normal conditions.

After drying approximately 480 g are obtained of a prepolymer powder (I) ready for use.

Fluidised bed polymerisation

This is identical to that of Example 1, except for the fact that instead of using prepolymer (D) prepolymer (I) is used.

After the introduction of prepolymer (I) into the fluidised bed reactor, a gradual rise in the temperature of the fluidised bed is noted, this increase in temperature attaining a maximum value Delta T of about 13° C., at the end of a time t Delta T equal to about 4 minutes.

During this time the rate of polymerisation, which at the moment of introduction of the prepolymer into the fluidised bed reactor corresponds to an initial activity($a_o$) equal to 7,350 g of $C_2H_4$/(mg.at. Ti)×(hr)×(-MPa $C_2H_4$), gradually increases up to the value which is equivalent to a maximum activity ($a_m$) equal to 10,200 g $C_2H_4$/(mg.at. Ti)×(hr)×(MPa $C_2H_4$), which value is attained at the end of a time ($ta_m$) equal to about 5 minutes after the introduction of a prepolymer into the reactor.

After this initial phase of the reaction, the rate of polymerisation then decreases relatively slowly as time goes on, so that at the end of 2 hours of reaction, approximately 2,040 g of polyethylene have been produced, containing $9.8 \times 10^{-5}$ milligramme atoms of titanium per gramme.

The main polymerisation characteristics are set out in Table I.

EXAMPLE 6

Prepolymerisation and carbon monoxide treatment

This is identical to that of Example 1, except for the fact that instead of introducing a volume of 1.5 ml of carbon monoxide into the suspension of prepolymers (C), there is introduced a volume of 2.1 ml of carbon monoxide, measured under normal conditions.

After drying there are obtained approximately 48 g of a prepolymer powder (J) ready for use.

Fluidised bed polymerisation

This is identical to that of Example 1, except for the fact that instead of using prepolymer (D), prepolymer (J) is used.

After the introduction of the prepolymer (J) into the fluidised bed reactor, a gradual rise in temperature of the fluidised bed is noted, this increase in temperature attaining a maximum value Delta T of approximately 8° C., at the end of a time t Delta T equal to approximately 5 minutes.

During this period the rate of polymerisation which, at the moment of introduction of the prepolymer into the fluidised bed reactor corresponds to an initial activity (ao) equal to 4,650 g of $C_2H_4$/mg.at. Ti)×(hr)×(-MPa $C_2H_4$), gradually increases up to a value which is equivalent to a maximum value ($a_m$) equal to 8,400 g $C_2H_4$/(mg.at. Ti)×(hr)×(MPa$C_2H_4$), which value is attained at the end of a period of ($ta_m$) equal to approximately 6 minutes after the introduction of the prepolymer into the reactor.

After this initial phase of the reaction the rate of polymerisation then decreases relatively slowly as time goes on, so that at the end of 2 hours of reaction, approximately 1,680 g of polyethylene have been produced, containing $1.2 \times 10^{-4}$ milligramme atoms of titanium per gramme.

The main characteristics of this polymerisation are set out in Table I.

EXAMPLE 7

Prepolymerisation and carbon monoxide treatment

This is identical to that of Example 1, except for the fact that instead of introducing a volume of 1.5 ml of carbon monoxide into the suspension of prepolymer (C) there is introduced a volume of 2.8 ml of carbon monoxide measured under normal conditions.

After drying there are obtained approximately 480 g of a prepolymer powder (K) ready for use.

Fluidised bed polymerisation

This is identical to that of Example 1, except for the fact that instead of using prepolymer (D) prepolymer (K) is used After the introduction of prepolymer (K) into the fluidised bed reactor, a gradual rise in the temperature of the fluidised bed is noted, this increase in temperature attaining a maximum value Delta T of approximately 8° C. at the end of a period $T_{Delta\ T}$ equal to approximately 5 minutes.

During this period the rate of polymerisation which, at the moment of introduction of the prepolymer into the fluidised bed reactor corresponds to an initial activity ($a_o$) equal to 3,900 g of $C_2H_4$/(mg.at. Ti)×(hr)×(-MPa $C_2H_4$), gradually increases up to a value which is equivalent to a maximum value ($ta_m$) equal to 8,100 g of $C_2H_4$/(mg.at. Ti)×(hr)×(MPa $C_2H_4$), which value is attained at the end of a period ($ta_m$) equal to approximately 7 minutes after the introduction of the prepolymer into the reactor.

After this initial phase of reaction, the rate of polymerisation then decreases relatively slowly as time goes on, so that at the end of 2 hours of reaction approximately 1,620 g of polyethylene have been produced containing $1.2 \times 10^{-4}$ milligramme atoms of titanium per gramme.

The main characteristics of this polymerisation are set out in Table I.

EXAMPLE 8

Prepolymerisation and carbon monoxide treatment

This is identical to that of Example 1, except for the fact that instead of introducing into the reactor 8 ml of a 0.6 molar solution of TnOA in n-hexane, there are introduced 6 ml of the same solution. In this way, after prepolymerisation there is obtained a suspension of prepolymer (L) in n-hexane.

This suspension of prepolymer (L) is totally degassed in order to eliminate the residual ethylene still present in the suspension. The reactor is heated to 80° C., and there are introduced into it with stirring a volume of 1.5 ml of carbon monoxide measured under normal conditions. This suspension is maintained with stirring at this temperature 1 hour. At the end of this time it is cooled to ambient temperature (20° C.) and there are added under a blanket of nitrogen 22 ml of the 0.6 molar solution of TnOA in n-hexane. This suspension is then transferred into a rotary drier where the prepolymer is dried at 70° C., under an atmosphere of nitrogen. In this way approximately 480 g are obtained of a prepolymer powder (M) ready for use.

Fluidised bed polymerisation

This is identical of that of Example 1, except for the fact that instead of using prepolymer (D), prepolymer (M) is used.

After the introduction of the prepolymer (M) into the fluidised bed reactor, a gradual rise in temperature of the fluidised bed is noted, this increase in temperature attaining a maximum value Delta T of approximately 10° C. at the end of a time $t_{DeltaT}$ equal to approximately 6 minutes.

During this time the rate of polymerisation which, at the moment of introduction of the prepolymer into the fluidised bed reactor, corresponds to an initial activity $(a_o)$ equal to 5,400 g of $C_2H_4$/(mg.at. Ti)×(hr)×(MPa $C_2H_4$), gradually increases up to a value which is equivalent to a maximum activity $(a_m)$ equal to 10,500 g of $C_2H_4$/(mg.at. Ti)×(hr)×(MPa $C_2H_4$), which value is attained at the end of a period $(ta_m)$ equal to approximately 6 minutes after the introduction of prepolymer into the reactor.

After this initial phase of reaction, rate of polymerisation then decreases relatively slowly as time goes on so that at the end of 2 hours of reaction, approximately 2,100 g of polyethylene has been produced containing $9.5 \times 10^{-5}$ milligramme atoms of titanium per gramme.

The main characteristics of this polymerisation are set out in Table I.

EXAMPLE 9

Prepolymerisation and carbon monoxide treatment

This is identical to that of Example 1, except for the fact that instead of introducing into the reactor 8 ml of a 0.6 molar solution of TnOA in n-hexane, 15 ml of this same solution are introduced. In this way after prepolymerisation a suspension of prepolymer (N) in n-hexane is obtained.

This suspension of prepolymer (N) is totally degassed in order to eliminate the residual ethylene still present in the suspension. The reactor is heated to 80° C., and there is introduced with stirring a volume of 1.5 ml of carbon monoxide measured under normal conditions. This suspension is maintained with stirring at this temperature for 1 hour. At the end of this time it is cooled to ambient temperature (20° C.) and there are added under a blanket of nitrogen 13 ml of 0.6 molar solution of TnOA in n-hexane. This suspension is then decanted into a rotary drier where the prepolymer is dried at 70° C. under an atmosphere of nitrogen. In this way approximately 480 g are obtained of a prepolymer powder (P) ready for use.

Fluidised bed polymerisation

This is identical to that of Example 1 except for the fact that instead of using prepolymer (D) prepolymer (P) is used.

After the introduction of prepolymer (P) into the fluidised bed reactor, a gradual rise in the temperature of the fluidised bed is noted, this increase in temperature attaining a maximum value Delta T of approximately 12° C. at the end of a time TDelta T equal to approximately 3 minutes.

During this period the rate of polymerisation which, at the moment of introduction of the prepolymer into the fluidised bed reactor, corresponds to an initial activity $(a_o)$ equal to 6,000 g of $C_2H_4$/(mg.at. Ti)×(hr)×(MPa$C_2H_4$), gradually increases up to a value which is equivalent to maximum activity $(a_m)$ equal to 9,900 g of $C_2H_4$/(mg.at. Ti)×(hr)×(MPa$C_2H_4$), which value is attained at the end of a time $(ta_m)$ equal to approximately 3 minutes after the introduction of the prepolymer into the reactor. After this initial phase of the reaction, the rate of polymerisation then decreases relatively slowly as time goes on, so that at the end of 2 hours of reaction, approximately 1,800 g of polyethylene have been produced, containing $1.1 \times 10^{-4}$ milligramme atoms of titanium per gramme.

The main characteristics of this polymerisation are set out in Table I.

EXAMPLE 10

Prepolymerisation and carbon dioxide treatment

This is identical to that of Example 1, except for the fact that instead of introducing a volume of 1.5 ml of carbon monoxide into the suspension of prepolymer (C) there is introduced a volume of 1.5 ml of carbon dioxide measured under normal conditions.

In this way after drying there are obtained approximately 480 g of a prepolymer powder (Q) ready for use.

Fluidised bed polymerisation

This is identical to that of Example 1, except for the fact that instead of using prepolymer (D), prepolymer (Q) is used.

After the introduction of prepolymer (Q) into the fluidised bed reactor, a gradual rise in the temperature of the fluidised bed is noted, this increase in temperature attaining a maximum value Delta T of approximately 12° C., at the end of a time t $_{Delta\ T}$ equal to approximately 4 minutes.

During this time the rate of polymerisation which, at the reactor, corresponds to an initial activity $(a_o)$ equal to 6,000 g of $C_2H_4$/(meg.at. Ti)×(hr)×(MPa$C_2H_4$), gradually increases up to value which is equivalent to a maximum activity $(a_m)$ equal to 9,900 g $C_2H_4$/(mg.at.Ti)×(hr)×(MPa$C_2H_4$), which value is attained at the end of a period $(ta_m)$ equal to approximately 5 minutes after the introduction of the prepolymer into the reactor.

After this initial phase of the reaction the rate of polymerisation then decreases relatively slowly as time goes on, so that at the end of 2 hours of reaction approximately 1,980 g of polyethylene has been produced, containing $1.0 \times 10^{-4}$ milligramme atoms of titanium per gramme.

EXAMPLE 11

(Comparative)

Catalyst Preparation

This was identical to that given in Example 1.

Treatment of Catalyst with Carbon Monoxide

Into a 5 liter stainless steel reactor provided with a stirrer rotating at 750 RPM and containing 2 liters of n-hexane at 80° C. there are introduced under a nitrogen blanket, a quantity of catalyst (B) prepared as in Example 1 corresponding to 6 milligram atoms of titanium, when 1.5ml of carbon monoxide gas measured under normal conditions. The stirred suspension was maintained at this temperature for 1 hour and was then cooled to 20° C. and finally degassed using a current of nitrogen.

Prepolymerisation

The suspension of catalyst prepared in the previous step was reheated in the same reactor to 70° C. and there are introduced (under a $N_2$ blanket) 8ml of a solution of 0.6 molar TnOA in n-hexane and 1.5 liter of hydrogen gas (measured under normal conditions). Then ethylene is added at a rate of 150g/hour for 90 minutes, followed by a further addition of 1.5 liter of hydrogen, and finally for a further 90 minutes ethylene is added at 150g/hr. The produced suspension of prepolymer (R) is hexane was cooled to 20° C. and, under a nitrogen blanket, 20ml of a 0.6 molar solution of TnOA in n-hexane was added. The suspension is then transferred to a rotary drier where the prepolymer was dried at 70° C. under $N_2$. In this way there were obtained, approximately 1057 480 g of prepolymer powder (R), ready for use, containing $1.25 \times 10^{-2}$ milligram atoms of titanium per gramme and having a mean particle diameter by mass of about 120 microns.

Fluidised Bed Polymerisation

This was identical to Example 1 except that prepolymer (R) was employed instead of prepolymer (D).

After the introduction of prepolymer (R) into the reactor there was a rapid and intense temperature rise in the fluid bed, corresponding to a delta T of about 29° C. achieved during a short time $t_{deltaT}$ of about 0.5 minutes.

The polymerisation reaction in fact has its maximum speed from the moment of introduction of the prepolymer into the fluidised bed reactor.

The initial activity ($a_o$) which is then at the same time the maximum activity ($a_m$) is equal to 13500 g $C_2H_4$/(mg.atom Ti)×(hr)×(MPa$C_2H_4$). In this initial phase of the reaction the heat evolution is so rapid and intense that the prepolymer particles heat up to their melting temperature and form agglomerates necessitating a shut-down of the polymerisation.

This comparative test shows that when treatment with carbon monoxide is applied to the catalyst itself, rather than to the catalyst system which has been converted by prepolymerisation, it is not possible to achieve satisfactory control of the catalyst activity during the initial phase of the gas fluidised bed polymerisation reaction.

Definitions of the abbreviations in Table I r   atomic ratio of the quantity of aluminium in the cocatalyst (b) used for the prepolymerisation to the quantity of titanium in the catalyst, CO/Ti: ratio of the number of gramme molecules of carbon monoxide to the number of gramme atoms of titanium in the catalyst, R:  atomic ratio of the quantity of aluminium in the cocatalyst (c) used after the prepolymerisation and the carbon monoxide treatment, to the quantity of titanium in the catalyst, $a_o$: initial activity expressed in $gC_2H_4$/(mg.at.Ti)×(hr)×(MPa$C_2H_4$), $a_m$: maximum activity, expressed in $gC_2H_4$/(mg.at.Ti)×(hr)×(MPa$C_2H_4$), $ta_m$: time necessary to attain maximum activity, $a_m$, Delta T: maximum increase in temperature of the fluidised bed, $t_{Delta\ T}$: time necessary to attain the maximum increase in the temperature of the fluidised bed.

TABLE I

| Example | r | CO/Ti | R | $a_o$ | $a_m$ | $t_{am}$ (mn) | Delta T (°C.) | $t_{Delta\ T}$ (mn) | Content of titanium in the polymer (mg.at.Ti/g) |
|---|---|---|---|---|---|---|---|---|---|
| 1 | 0.8 | 0.01 | 2.0 | 5 850 | 9 600 | 5 | 11 | 4 | $1.1 \times 10^{-4}$ |
| 2 (comparative) | 0.8 | 0 | 2.0 | 14 100 | — | 0 | 30 | 0.5 | (agglomerates) |
| 3 (comparative) | 2.8 | 0.01 | 0 | 5 000 | — | 0 | 9 | 0.5 | $5.0 \times 10^{-4}$ |
| 4 (comparative) | 2.8 | 0 | 0 | 11 700 | — | 0 | 24 | 0.5 | (agglomerates) |
| 5 | 0.8 | 0.005 | 2.0 | 7 350 | 10 200 | 5 | 13 | 4 | $9.8 \times 10^{-5}$ |
| 6 | 0.8 | 0.015 | 2.0 | 4 650 | 8 400 | 6 | 8 | 5 | $1.2 \times 10^{-4}$ |
| 7 | 0.8 | 0.020 | 2.0 | 3 900 | 8 100 | 7 | 8 | 5 | $1.2 \times 10^{-4}$ |
| 8 | 0.6 | 0.01 | 2.2 | 5 400 | 10 500 | 6 | 10 | 6 | $9.5 \times 10^{-5}$ |
| 9 | 1.5 | 0.01 | 1.3 | 6 000 | 9 900 | 3 | 12 | 3 | $1.1 \times 10^{-4}$ |

We claim:

1. Process for the polymerisation or copolymerisation of alpha-olefins comprising from 2 to 8 carbon atoms in a fluidized bed, by means of a catalyst system of the Ziegler-Natta type consisting of a catalyst (a) comprising atoms of magnesium, halogen titanium and/or vanadium, and of a cocatalyst (b) consisting of an organometallic compound selected from the group consisting of organoaluminium and organozinc compounds, the catalyst system being converted into a prepolymer by bringing one or several alpha-olefins into contact with the catalyst system in such quantities that the prepolymer contains per gram from $2 \times 10^{-3}$ to $10^{-1}$ milligram of atoms of titanium and/or vanadium, and the atomic ratio of the quantity of metal of the cocatalyst (b) to the quantity of titanium and/or vanadium is comprised between 0.5 and 50, the process being characterized in that the prepolymer is (i) previously subjected to a treatment by carbon monoxide or carbon dioxide, in the absence of alpha-olefin, in such a quantity that the ratio of the number of grams of molecules of carbon monoxide or dioxide to the number of grams of atoms of titanium and/or vanadium is comprised between 0.001 and 0.1, and (ii) then brought into contact with one or several alpha-olefin(s) under polymerisation or copolymerisation conditions in a fluidized bed, in the presence of a cocatalyst (c);

said cocatalyst (c) consisting of an organometallic compound selected amongst organoaluminum and organozinc compounds, which is identical to or different from cocatalyst (b), in a quantity such that the atomic ratio of the quantity of metal in the said cocatalyst (c) to the quantity of titanium and/or vanadium is comprised between 0.5 and 100.

2. Process according to claim 1, characterized in that catalyst system is concerted into a prepolymer containing per gram from $4 \times 10^{-3}$ to $3 \times 10^{-2}$ milligram atoms of titanium and/or vanadium.

3. Process according to claim 1, characterized in that the catalyst system converted into a prepolymer comprises solid particles having a mean diameter by mass comprised between 50 and 300 microns.

4. Process according to claim 1, characterized in that the quantity of carbon monoxide or carbon dioxide used in such that the ratio of the number of gram molecules of carbon monoxide or dioxide to the number of gram of atom of titanium and vanadium is comprised between 0.002 and 0.05.

5. Process according to claim 1, characterized in that the treatment of the prepolymer by carbon monoxide or carbon dioxide is performed at a temperature comprised between 0° and 150° C., during a period comprised between 3 and 300 minutes.

6. Process according to claim 1, characterized in that the quantity of cocatalyst (c) used is such that the atomic ratio of the quantity of metal in the said cocatalyst (c) to the quantity of titanium and/or vanadium is comprised between 0.7 and 60.

7. Process according to claim 1, characterized in that the catalyst (a) corresponds to the general formula:

$$Mg_m \, Me_n \, M \, (OR_1)_p \, (R_2)_q \, X_r \, D_s$$

in which

Me is an aluminum and/or zinc atom, M is a titanium and/or vanadium atom, $R_1$ is an alkyl group comprising from 2 to 14 carbon atoms, $R_2$ is an alkyl group comprising from 2 to 12 carbon atoms, X is a chlorine and/or bromine atom, D is an electron donor compound, where m is comprised between 0.5 and 50,
n is comprised between 0 and 1,
p is comprised between 0 and 3,
q is comprised between 0 and 1,
r is comprised between 2 and 104, and
s is comprised between 0 and 60.

8. Process according to claim 1, characterized in that the catalyst system converted into a prepolymer contains such a quantity of cocatalyst (b) that the atomic ratio of the quantity of metal in the said cocatalyst (b) to the quantity of titanium and/or vanadium is comprised between 0.7 and 10.

9. Process according to claim 1, characterized in that the treatment of the prepolymer by carbon monoxide or carbon dioxide is performed under a partial pressure of carbon monoxide or dioxide less than $5 \times 10^2$ Pa.

* * * * *

UNITED STATES PATENT AND TRADEMARK OFFICE
CERTIFICATE OF CORRECTION

PATENT NO. : 4,921,920

DATED : May 1, 1990

Page 1 of 2

INVENTOR(S) : JOELLE COLLOMB-CECCARINI et al

It is certified that error appears in the above-identified patent and that said Letters Patent is hereby corrected as shown below:

Col. 4, l. 25, correct spelling of the word "t$\underline{e}$travalent"

Col. 4, l. 53, formula should read "$TiX_4-t(OR_1)t/Mg$"

Col. 10, l. 67, correct spelling of word "isota$\underline{t}$ic"

Col. 13, l. 46 "nitrogen 25ml" should read "nitrogen 2$\underline{8}$ ml"

Col. 15, l. 64 "(ao) equal to" should read "($a_o$) equal to"

Col. 18, l. 42 "$C_2H_4$/meg.at. Ti)X" should read "$C_2H_4$/($\underline{mg}$.at.Ti)X"

Col. 18, l. 68, should read "$\underline{t}$hen 1.5ml"

Claim 1, col. 20, l. 53, after "milligram" and before "atoms" strike "of"

Claim 1, col. 20, l. 63, change "grams" of molecules" to --gram molecules-

Claim 1, col. 20, l. 64, change "grams" to --gram--, and cancel "of" before "atoms"

Claim 2, col. 21, l. 11 correct the spelling of "converted"

UNITED STATES PATENT AND TRADEMARK OFFICE
CERTIFICATE OF CORRECTION

PATENT NO. : 4,921,920

DATED : May 1, 1990

Page 2 of 2

INVENTOR(S) : JOELLE COLLOMB-CECCARINI ET AL

It is certified that error appears in the above-identified patent and that said Letters Patent is hereby corrected as shown below:

Claim 4, 1. 4, after "gram", strike "of" and same claim, 1. 5, change "atom" to --atoms--

Signed and Sealed this

Seventeenth Day of December, 1991

Attest:

HARRY F. MANBECK, JR.

Attesting Officer

Commissioner of Patents and Trademarks